Feb. 9, 1960 B. E. REYNOLDS 2,924,130
ADJUSTABLE MULTI-CUTTER TOOL
Filed May 7, 1958
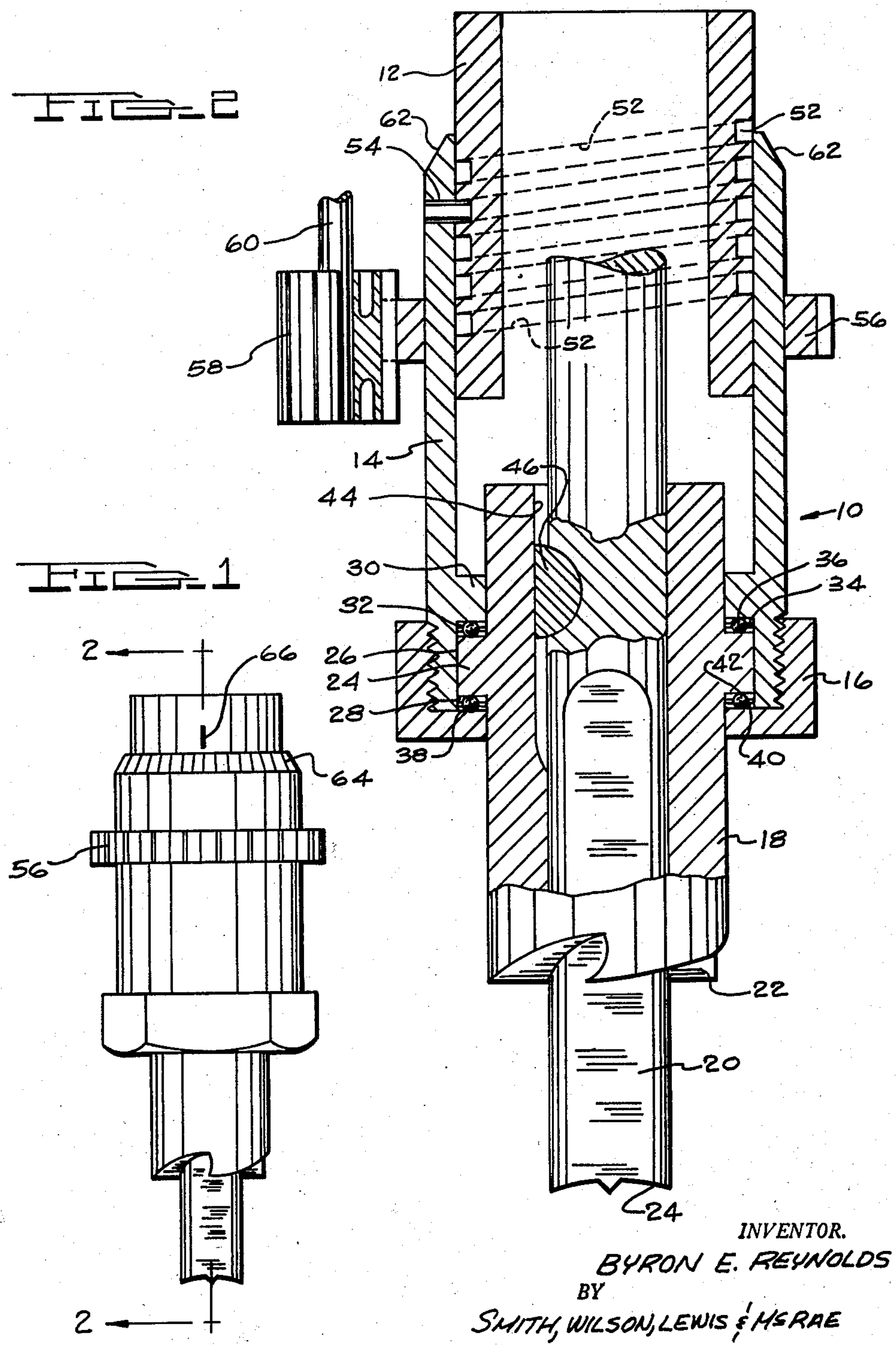
INVENTOR.
BYRON E. REYNOLDS
BY
SMITH, WILSON, LEWIS & McRAE United States Patent Office 2,924,130

Patented Feb. 9, 1960

2,924,130

ADJUSTABLE MULTI-CUTTER TOOL

Byron E. Reynolds, Dearborn, Mich.

Application May 7, 1958, Serial No. 733,737

10 Claims. (Cl. 77—65)

This invention relates to power driven rotary cutter tools, and particularly to a cutting tool having two or more concentric rotating cutters which are rapidly adjustable to various different relative cutting depths.

Previous to the present invention there have been provided drilling tools utilizing two or more cutting diameters ground on a solid tool or utilizing an adjustable cutting sleeve surrounding a conventional cutter such as a drill, milling cutter or reamer. The concentric cutters have been utilized for such combined cutting operations as drilling and countersinking, boring and counterboring, reaming and spot facing, side cutting with a formed end mill, and hollow milling step bosses. The materials which can be worked on with the concentric rotating cutters cover the entire machineable range, and include such as wood, carbon, rubber, steel, iron, granite and aluminum.

Adjustment of the relative cutting depths with prior art structures has required the operator to stop rotation of the spindle, unlock the cutters, and reset the cutters to externally provided means of measurement. Such multiple diameter cutters intended for infrequent change of relative depth are commercially available in many forms and are shown in such U.S. patents as Judson 613,572, Webb 835,125, Broadbent 1,095,185, Hayden 1,398,779 and Bowen 2,667,795.

The present invention seeks to improve on the prior art arrangements by providing structural features for easier adjustment of the relative cutting depths, both during rotation of the cutters and when the cutters are stopped, together with mechanisms for conveniently indicating the cutting depth to which the cutters are set.

One object of the present invention is to provide a multi-diameter cutter with means for rapidly adjusting the axial relationship of the cutter elements.

Another object of the invention is to provide a simple low cost measuring mechanism for calibrating the cutting depth positions.

Another object of the invention is to provide a multi-diameter cutter with adjustment structure for effecting step by step cutter depth changes, continuous cutter depth changes, or any desirable progression or combination of cutter depth changes.

Another object of the invention is to provide a multi-diameter cutter with mechanism for adjusting the relative cutting depth of the cutters without stopping either of the cutters and without in any way hampering the cutting operation or causing such speed changes in the operation as might tend to undesired variation in the contour of the final work surface. Attainment of this object permits machining to closer tolerances of iron and steel punches and dies, wood or rubber stretch press forms, and wood or metal patterns.

Another object of the invention is to provide a multi-diameter cutter of the above described character wherein the construction of parts is such as to carry heavy end thrust loads without parts malfunctioning or parts breakage.

Another object of the present invention is to provide a multi-diameter cutter of the above described character wherein the parts are of such design as to be of high strength construction.

Another object of the invention is to provide a multi-diameter cutter wherein the component parts are easily and quickly assembled together so as to reduce assembly costs.

Another object of the invention is to provide a multi-diameter cutter wherein a minimum number of component parts are employed.

Other objects of this invention will appear in the following description and appended claims, reference being had to the accompanying drawings forming a part of this specification wherein like reference characters designate corresponding parts in the several views.

In the drawings:

Fig. 1 is an elevational view of one embodiment of the invention.

Fig. 2 is a sectional view taken on line 2—2 of Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, there is shown a multi-cutter assembly 10 comprising a supporting structure formed by a sleeve 12 and slidable sleeve 14. Sleeve 12 is adapted for attachment to the quill of a cutting machine (by means not shown) so as to serve as a mount for the illustrated apparatus. Sleeve 14 is adapted for rotary adjusting movement on sleeve 12 and is provided with a cap member 16 at its lower end for suspending concentric cutter elements 18 and 20.

Cutter element 18 is formed as an annular element having cutting teeth 22 and a peripheral outwardly radiating flange 24 which is machined to form raceways 26 and 28. Suspension sleeve 14 is provided with an inwardly radiating flange 30 which is machined to provide an annular raceway 32 opposing raceway 26. A movable anti-friction assembly, comprising an annular retainer 34 and balls 36, is positioned between raceways 26 and 32 so as to act as a thrust bearing operative under load during the cutting operation. Cap member 16 is machined to provide a raceway 38 opposing the aforementioned raceway 28. A movable anti-friction assembly, including annular retainer 40 and balls 42 is positioned between raceways 28 and 38 to act as a thrust bearing during retraction of the cutting tool relative to the work.

Annular cutter element 18 is provided with an axial extending slot 44 which defines a keyway for receiving key 46 carried by cutter element 20. Keyway 44 and key 46 cooperate to permit axial movement of cutter element 20 relative to cutter element 18 while preventing any relative rotary movement between the cutter elements.

The illustrated apparatus is intended for use with a cutting machine of the type wherein the rotary spindle is carried within an axially movable sleeve or quill. Axial movement of the quill (manually or under power) is effective to drive the spindle and cutting tool toward the work. In use of the illustrated apparatus cutting element 20 is extended upwardly through cutter element 20 to securement on the spindle of the cutting machine (not shown). Thus, when the cutting machine spindle is rotated, cutting tools 20 and 22 are rotated together. Since the cutting teeth 24 of cutter element 20 are located below cutting teeth 22 of element 18 the cutter element 20 will initially cut into the work without any cutting being effected by teeth 22. However, as the cutting operation proceeds the spindle and quill of the machine are lowered together, with a consequent entry of teeth 22 into the work. In some instances the machine quill does not move axially; instead the work is positioned on a work table which travels toward the cutting tools.

Whatever the construction of the machine and its relation to the work, it will be seen that two concentric cutting operations are effected on the work, with teeth 22 cutting to a lesser depth than teeth 24. Difference in cutting depth between teeth 22 and teeth 24 is controlled by the initial relative positions of sleeves 12 and 14. Sleeve 12 and sleeve 14 may be adjusted axially relative to one another by means of the spiral cam trackway 52 and cam follower 54. Thus by holding sleeve 12 motionless, rotation of sleeve 14 in one direction will cause cam 54 to travel upwardly in spiral cam trackway 52 so as to move the sleeve 14 upwardly. Rotation of sleeve 14 in the opposite direction is effective to cause cam 54 to travel in a downward spiral along trackway 52 so as to locate sleeve 14 in a lowered position relative to sleeve 12. By lowering the position of sleeve 14 relative to sleeve 12 cutting element 20 will be allowed to penetrate further into the work before teeth 22 contact the work. As a result the effective axial spacing between teeth 24 and teeth 22 is increased as compared with the spacing which would be achieved if sleeve 14 were in an elevated position on sleeve 12.

Sleeve 14 may be adjusted axially on sleeve 12 by manual means such as a hand wheel affixed to sleeve 14, or by the illustrated means which includes ring gear 56 affixed to sleeve 14 and pinion gear 58 carried by shaft 60. Suitable power means (not shown) may be arranged to rotate shaft 60 so as to act on gear 56 for effecting rotation of sleeve 14 to the desired axial position on sleeve 12. The adjusting operation may be performed while the machine is cutting, the magnitude of the adjustment being susceptible of continuous variation in accordance with the desired profile of the finished work. In this connection, it will be appreciated that the work may be caused to have a relative traverse at right angles to the cutting tools so as to develop a desired work profile, such operation being employed for example in the formation of wood models in the automotive industry.

The upper edge portion of sleeve 14 is beveled at 62 and a series of equally spaced calibration markings 64 are provided on bevel portion 62 so as to cooperate with the pointer marking 66 on sleeve 12 for indicating the axial position of sleeve 14 relative to sleeve 12. In this manner the effective axial spacing of teeth 22 and 24 is accurately ascertainable without stopping the machine. Calibration markings 64 may be spaced to indicate any appropriate gradation in the spacing between teeth 22 and teeth 24, as for example .005 inch which is the working tolerance presently employed in the construction of wood models utilized in the automobile industry.

It will be noted that the adjustment structure formed by sleeves 12 and 14 is never rotating at high speeds, the high speed operations being confined to the cutter elements 18 and 20. As a result adjustment of sleeve 14 may be effected while the machine is running without impairing the cutting operation. The adjusting operation takes place without parts jamming or other malfunctioning. During the cutting operation the thrust bearing assemblies take the axial loads, both during advancement and retraction of the cutters relative to the work; as a result the cutting elements are freely rotatable without interference from member 14.

I claim:

1. A multi-cutter construction comprising a support structure; said support structure comprising a mounting member and a suspending member rotatably carried by said mounting member; cam-cam follower means interlocking the two members so as to effect extension of the suspension member relative to the mounting member in response to rotary motion of the suspension member in one direction and retraction of the suspension member relative to the mounting member in response to rotation of the suspension member in the opposite direction; a first annual cutter element carried by the suspension member for rotary movement relative thereto; a second cutter element carried within the first cutter element and free for axial sliding motion relative thereto; and key means between the first and second cutter elements for preventing relative rotation between said cutter elements and guiding said cutter elements for relative axial movements.

2. The combination comprising a supporting structure; said supporting structure comprising a mounting member and a cutter suspension member rotatably carried by the mounting member; one of said members having a spiral trackway therein, the other of said members having a follower member projecting into said trackway so as to effect axial retraction and extension of the suspension member away from the mounting member in response to rotation of the suspension member in opposite directions; a first annular cutter element rotatably carried by the suspension member; and a second cutter element carried within said first cutter element for axial movement relative thereto; and means between the cutter elements preventing relative rotation therebetween.

3. The combination comprising a support structure; said support structure comprising a mounting member and a cutter element suspension member rotatably carried by said mounting member; means between said mounting member and said suspension member for effecting axial movement of the suspension member relative to the mounting member in response to rotary movement of the suspension member; a first cutter element carried by the suspension member for free rotation thereon; a second cutter element extending within the first cutter element; and means between the two cutter elements preventing relative rotation between the two cutter elements and guiding them for relative axial movements, said last mentioned means thereby serving as a driving connection for effecting simultaneous rotation of the two cutter elements.

4. The combination comprising a support structure including a mounting member and a cutter suspension member rotatably carried by the mounting member; means between said members for effecting relative axial movement of said members in response to rotary movement of the suspension member; indicator means calibrated to indicate the extent of axial separation of the mounting member and suspension member; a first annular cutter element carried by the suspension member for free rotation thereon; a second cutter element extending within said first cutter element; and means locking the first and second cutter elements against relative rotation while guiding them for relative axial movement.

5. The combination comprising a support structure; said support structure comprising a mounting sleeve and a suspension sleeve telescopically carried thereon; a spiral trackway formed in one of said sleeves; a cam projecting from the other sleeve into said trackway, whereby rotation on the suspension sleeve is effective to produce relative axial movement between the two sleeves; a first cutter element rotatably carried by the suspension sleeve; a second cutter element extending within the first cutter element; and means for guiding the two cutter elements for relative axial movement while preventing relative rotation between said cutter elements.

6. The combination comprising a support structure; said support structure including an axially adjustable sleeve structure; a first annular cutter element extending within said sleeve structure; one of said sleeve structure and cutter element having a pair of radial walls defining first and second annular raceways; the other of said sleeve structure and annular cutting element having a radial wall portion positioned between said raceways to provide third and fourth annular raceways; an anti-friction assembly interposed between the first and third raceways; a second anti-friction assembly interposed between the second and fourth raceways, said assemblies serving to rotatably support the cutter element and prevent axial movement of said cutter element relative to the sleeve structure; a second cutter element extending within the first cutter element; and means guiding the second cutter element for axial movement within the first cutter element while preventing relative rotation between said cutter elements.

7. The combination comprising an annular support structure; said support structure including an axially adjustable sleeve member; a cap element removably carried on the end of said sleeve and having an inwardly extending wall portion defining a first raceway; said sleeve member having an inwardly directed circumferential wall defining a second raceway; a first annular cutter element having a peripheral outwardly extending wall interposed between the first and second raceways to define third and fourth annular raceways; an anti-friction assembly positioned between the first and third raceways; a second anti-friction assembly interposed between the second and fourth raceways, whereby said cutter element is freely rotatably mounted within the sleeve member; a second cutter element extended within the first cutter element; and a driving connection between the first and second cutter elements guiding them for relative axial movement while preventing relative rotary movement.

8. The combination comprising a cutter assembly including two concentrically disposed cutter elements having interengaging guide surfaces guiding them for relatively axial movement; means for transmitting a rotary drive to one of the cutter elements; means for transmitting an axial drive to the other cutter element; said last mentioned means including two interengaged members defining a helical adjustment structure for varying the relative axial positions of the cutter elements.

9. The combination comprising a cutter assembly including two concentrically disposed cutter elements having interengaging guide surfaces guiding them for relative axial movements; means for transmitting a rotary drive to one of the cutter elements; means for transmitting an axial drive to the other cutter element; said last mentioned means including two interengaged members defining a combined rotary and axial adjustment structure for varying the relative axial positions of the cutter elements.

10. The combination comprising a cutter assembly including two concentrically disposed cutter elements having interengaged guide surfaces guiding them for relative axial movement; means for transmitting a rotary drive to one of the cutter elements; means for transmitting an axial drive to the other cutter element; said last mentioned means including two interengaged members defining a screw type adjustment structure for varying the relative axial positions of the cutter elements.

References Cited in the file of this patent

UNITED STATES PATENTS

| 511,872 | Bridwell | Jan. 2, 1894 |
|---|---|---|
| 2,027,385 | Kraut et al. | Jan. 14, 1936 |